US006550119B2

(12) United States Patent
Ishida et al.

(10) Patent No.: US 6,550,119 B2
(45) Date of Patent: Apr. 22, 2003

(54) INNER RING PRESS-INSERTION JIG FOR A PIPE MEMBER MADE OF RESIN

(75) Inventors: Takuya Ishida, Sanda (JP); Nobuhito Hirakawa, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/972,937

(22) Filed: Oct. 10, 2001

(65) Prior Publication Data

US 2002/0042979 A1 Apr. 18, 2002

(30) Foreign Application Priority Data

Oct. 16, 2000 (JP) ...................................... 2000-315228

(51) Int. Cl.[7] ................................................ B23P 19/04
(52) U.S. Cl. ........................................... 29/237; 29/251
(58) Field of Search .......................... 29/237, 251, 235, 29/234; 285/247

(56) References Cited

U.S. PATENT DOCUMENTS 1,094,978 A * 4/1914 Church ........................ 29/237
1,393,789 A * 10/1921 Kellenberger ................ 29/251
2,336,262 A * 12/1943 Krasberg ..................... 164/86
3,157,112 A * 11/1964 Truhon ....................... 100/231
4,835,851 A * 6/1989 Peele .......................... 29/272
5,203,062 A * 4/1993 Nishio ......................... 29/237
5,313,986 A * 5/1994 Jude ............................ 138/99
5,367,756 A * 11/1994 Huetinck ..................... 29/237

FOREIGN PATENT DOCUMENTS

JP 57-33983 7/1982
JP 7-20471 5/1995
JP 11-156750 6/1999

* cited by examiner

*Primary Examiner*—Joseph J. Hail, III
*Assistant Examiner*—Daniel Shanley

(57) ABSTRACT

A press insertion rod is passed through and supported by a press insertion rod supporting portion of a jig body in an advanceable and retractable manner. An inner ring which is to be pressingly inserted into one end portion of a pipe member made of resin is held by a ring holder. The ring holder is coupled idly rotatably and detachably to a tip end portion of the press insertion rod via a holder block.

7 Claims, 16 Drawing Sheets

Fig. 14 PriorArt

INNER RING PRESS-INSERTION JIG FOR A PIPE MEMBER MADE OF RESIN

BACKGROUND OF THE INVENTION

1. Field of the Invention

The present invention relates to a jig that is to be used in press insertion in which, in the case where pipe members made of resin for transporting a liquid having high purity or ultrapure water to be handled in a production process in production of semiconductor devices, production of medical equipment and medicines, food processing, chemical industry, or the like are connected to each other by means of a pipe joint, a sleeve-like inner ring is pressingly inserted into an inner periphery of one end portion of each of the pipe members in order to enhance the sealing property between the one end portion of the pipe member and the pipe joint, and prevent the pipe member from slipping off.

2. Description of the Prior Art

Conventionally, as an example of a pipe joint made of resin of this kind a configuration shown in FIG. 14 is known (for example, Japanese Utility Model Publication No. 7-20471). The pipe joint made of resin shown in FIG. 14 comprises a joint body 50, a sleeve-like inner ring 23, and a union nut (pressing ring) 51 which are made of resin having excellent chemical and heat resistances, such as fluororesin. In the joint body 50, a receiving port 52 is formed in one end in the axial direction, and a primary sealing portion 53 is formed in an inner area of the receiving port 52 so as to intersect with the axis C of the joint body 50. A secondary sealing portion 54 is formed in an entrance area of the receiving port 52 so as to intersect with the axis C, and an external thread portion 55 is formed on the outer periphery of the receiving port 52. In the inner ring 23, a fitting portion 56 having an outer diameter that allows the portion to be fitted into the receiving port 52 of the joint body 50 is formed in an inner end portion in the axial direction, and a bulge portion 57 having a mountain-like section shape is formed in an outer end side in the axial direction. The inner ring 23 is pressingly inserted into one end portion of a pipe member 14 made of resin under a state where the fitting portion 56 projects outwardly, whereby the diameter of the one end portion of the pipe member 14 is increased. An inner end sealing portion 58 which abuts against the primary sealing portion 53 of the joint body 50 is formed in an end portion of the fitting portion 56, and an outer peripheral sealing face 59 which abuts against the secondary sealing portion 54 of the receiving port 52 is formed in a place corresponding to the bulge portion 57. In the union nut 51, an internal thread portion 60 which is to be screwed to the external thread portion 55 of the joint body 50 is formed.

The pipe member 14 is connected to the configured pipe joint made of resin in the following manner. Under a state where the one end portion of the pipe member 14 into which the inner ring 23 is pressingly inserted is inserted into the receiving port 52 of the joint body 50, the internal thread portion 60 of the union nut 51 which is previously loosely fitted onto the outer periphery of the pipe member 14 is screw-fastened to the external thread portion 55 of the joint body 50. This fastening causes the inner ring 23 to be pressed in the axial direction, so that the inner end sealing portion 58 and the outer peripheral sealing face 59 of the inner ring 23 abut against the primary and secondary sealing portions 53 and 54 of the receiving port 52 of the joint body 50, respectively, thereby exerting a sealing function (sealing force).

A jig for pressingly inserting the inner ring 23 into one end portion of the pipe member 14 is disclosed in, for example, Japanese Utility Model Publication No. 57-33983 and Japanese Patent Application Laying-Open No. 11-156750.

In the inner ring press-insertion jig disclosed in Japanese Utility Model Publication No. 57-33983, as shown in FIG. 15, an outer ring 63 is set on a pipe member holding portion 62 disposed in the front end side of a jig table 61, one end portion of the pipe member 14 is passed through the outer ring 63 and horizontally held, and a screw rod 65 is screwed with an external thread portion 64 disposed in the rear end side of the jig table 61 so as to be advanceable and retractable. A pressing piece 66 is formed integrally with the tip end of the screw rod 65. The pressing member 66 is fitted into a hole of an inner ring 67. When the screw rod 65 is rotated by a handle 68 to be advanced in the direction of the arrow A, the inner ring 67 is pressingly inserted and fixed into the inner periphery of one end portion of the pipe member 14, and the outer ring 63 is pressingly inserted and fixed onto the outer periphery of the member.

FIG. 16 is a side view of the inner ring press-insertion jig disclosed in Japanese Patent Application Laying-Open No. 11-156750, and FIG. 17 is a section view showing a state where press insertion of an inner ring is ended. Referring to FIGS. 16 and 17, an outer ring 72 is set on a pipe member holding portion 71 disposed in the front end side of a jig body 70, one end portion of the pipe member 14 made of resin is passed through the outer ring 72 and horizontally held, and a screw rod 77 is screwed with an internal thread portion 73 disposed in the rear end side of the jig body 70 so as to be advanceable and retractable. A ball joint 78 is disposed in a tip end portion of the screw rod 77. A pin holding member 79 is attached to the ball joint 78. The pin holding member 79 holds a pressing pin 80. The pressing pin 80 is inserted into an inner ring 81. When the screw rod 77 is rotated by a handle 82 to be advanced in the direction of the arrow A, the inner ring 81 is pressingly inserted and fixed into the inner periphery of one end portion of the pipe member 14 made of resin, and the outer ring 72 is pressingly inserted and fixed onto the outer periphery of the member.

In the inner ring press-insertion jig shown in FIG. 15, when the pressing piece 66 at the tip end of the screw rod 65 is firmly fitted into the hole of the inner ring 67, the inner ring 67 corotates with the screw rod 65 during the press insertion of the inner ring 67. Consequently, there arises a disadvantageous situation in which torsional deformation is applied to the pipe member 14. By contrast, in the inner ring press-insertion jig shown in FIG. 16, the pin holding member 79 and the pressing pin 80 can be relatively rotated, and hence torsional deformation is not applied to the pipe member 14 during the press insertion of the inner ring 81.

As the inner rings 67 and 81, rings of various sizes having different diameters are required so as to comply with the bore diameter of the counter pipe member 14.

In the inner ring press-insertion jig shown in FIG. 15, the pressing piece 66 which holds the inner ring 67 is formed integrally with the tip end of the screw rod 65, and hence cannot be detached from the screw rod. In the inner ring press-insert ion jig shown in FIGS. 16 and 17, similarly, the pressing pin 80 which holds the inner ring 81 cannot be detached from the tip end portion of the screw rod 77. In both the inner ring press-insertion jigs, for each of different bore diameters of the counter pipe member 14, therefore, it is necessary to prepare inner ring pressinsertion jigs of several kinds comprising the inner ring 67 or 81 of a size corresponding to the bore diameter of the pipe member.

SUMMARY OF THE INVENTION

The present invention is aimed at solving the noted problems. It is an object of the present invention to provide an inner ring press-insertion jig which can pressingly insert an inner ring into one end portion of a pipe member made of resin without applying torsional deformation to the pipe member, and which can singly cope with inner rings of several sizes. It is another object of the invention to provide an inner ring press-insertion jig in which operations of attaching and detaching a ring holder for holding an inner ring can be simplified. It is a further object of the invention to provide an inner ring press-insertion jig which can suppress generation of abrasion powder that should be prevented as far as possible from entering a pipe member made of resin in view of prevention of contamination.

The inner ring press-insertion jig for a pipe member made of resin of the invention will be described with reference to the accompanying drawings. The reference numerals in the figures are used in this paragraph in order to facilitate the understanding of the invention, and the use of the reference numerals is not intended to restrict the contents of the invention to the illustrated embodiments.

The inner ring press-insertion jig for a pipe member of the invention is an inner ring press-insertion jig for inserting a sleeve-like inner ring into one end portion of a pipe member. A pipe member holding portion (2) which horizontally fixedly holds one end portion of a pipe member (14) is placed in a front end side in a longitudinal direction of a jig body (1), and a press insertion rod supporting portion (3) is placed in a rear end side to be opposed to the pipe member holding portion. A press insertion rod (19) is passed through and supported by the press insertion rod supporting portion (3) in an advanceable and retractable manner. A ring holder (20) which has at a front end a ring holding shaft portion (20*a*) that is to extractably hold an inner ring (23) is detachably coupled to a front end of the press insertion rod (19) to be idly rotatable about an axis.

According to the configured inner ring press-insertion jig, when the press insertion rod is advanced after one end portion of the pipe member is fixedly held by the pipe member holding portion and the inner ring is held by the ring holder, the inner ring can be pressingly inserted into the one end portion of the pipe member.

The ring holder is coupled to the front end of the press insertion rod so as to be idly rotatable about the axis. After the insertion, therefore, the ring holder can be extracted from the inner ring in the pipe member without applying torsional deformation to the pipe member. Since the ring holder is detachably coupled to the front end of the press insertion rod to enable replacement of the ring holder, the single jig can be commonly used for press insertion of inner rings of various diameters.

The configuration for coupling detachably and idly rotatably the ring holder (20) to the front end of the press insertion rod (19) may be specifically structured in the following manner. An internal thread hole portion (29) is disposed in a center portion of a front end face of the press insertion rod (19), a coupling shaft portion (20*b*) protrudes rearwardly from a center portion of a rear end face of the ring holder (20), a holder block (26) is passed idly rotatably and lockedly through the coupling shaft portion (20*b*), the holder block having: a cylindrical portion (24) in which an external thread portion (24*a*) is formed on an outer periphery; and a flange (25) which is formed integrally with a front end of the cylindrical portion, and the external thread portion (24*a*) of the cylindrical portion (24) is screwingly coupled to the internal thread hole portion (29).

According to the inner ring press-insertion jig, the ring holder can be easily attached to or detached from the press insertion rod by a simple operation of fastening or loosening the holder block to or from the internal thread hole portion of the press insertion rod by means of the screwing of female and male thread portions. Since the coupling shaft portion of the ring holder is passed through the long cylindrical portion which elongates in the axial direction of the holder block, the ring holder is held stably and idly rotatably in a cantilevered manner without causing runout.

In this case, a washer (27) made of low-friction resin may be interposed between the rear end face of the ring holder (20) and the flange (25) of the holder block (26). According to this configuration, the ring holder can be smoothly idly rotated, and generation of abrasion powder that is prevented as far as possible from entering a pipe member made of resin in view of prevention of contamination is prevented from occurring between the rear end face of the ring holder and the flange of the holder block.

At least one of the ring holder (20) and the holder block (26) may be formed by a low-friction resin material. According to this configuration, the ring holder can be smoothly idly rotated, and generation of abrasion powder is prevented from occurring between the outer peripheral face of the coupling shaft portion of the ring holder and the inner peripheral face of the cylindrical portion of the holder block.

DETAILED DESCRIPTION OF THE PREFERRED EMBODIMENT

Figure 1:
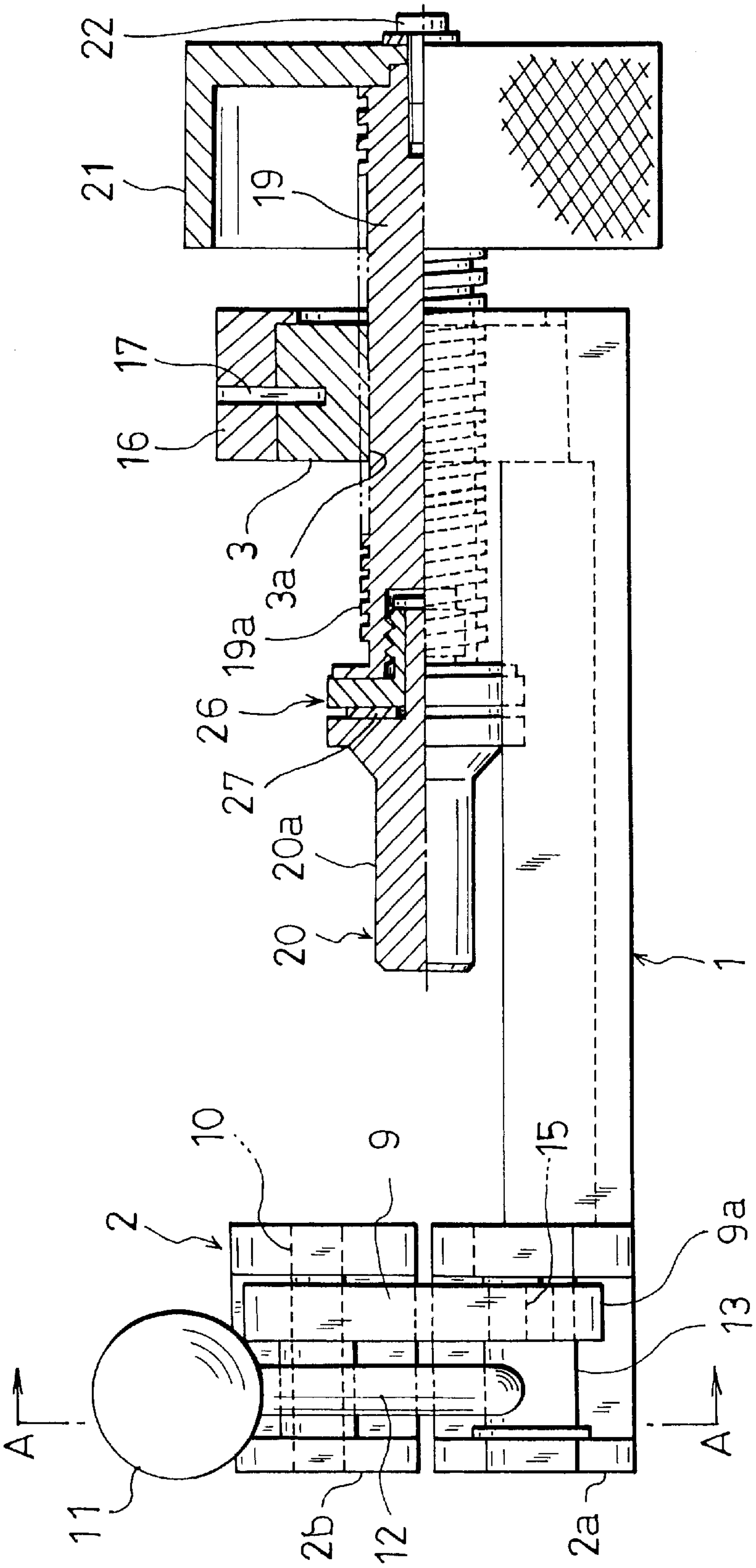
FIG. 1 is a longitudinal section view showing an inner ring press-insertion jig of an embodiment of the invention in a half cutaway state.

Referring to FIG. 1, in the inner ring press-insertion jig for a pipe member made of resin according to the invention, a pipe member holding portion 2 is placed in a front end side in the longitudinal direction of a jig body 1 made of a metal, and a press insertion rod supporting portion 3 is placed in a rear end side in the longitudinal direction so that the portions are opposed to the pipe member holding portion.

Figure 2:
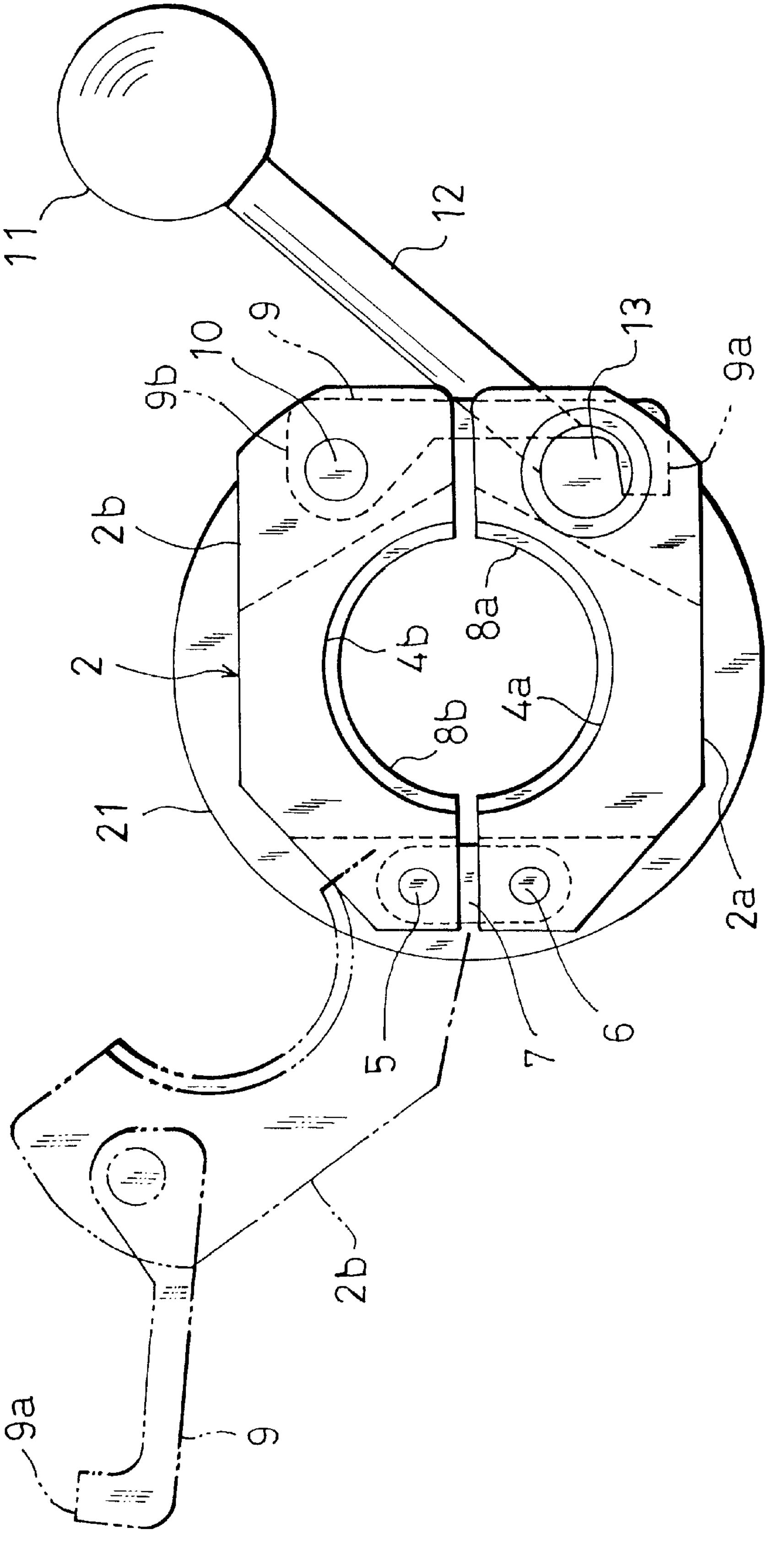
FIG. 2 is a front view of the inner ring press-insertion jig of FIG. 1.
Figure 3:
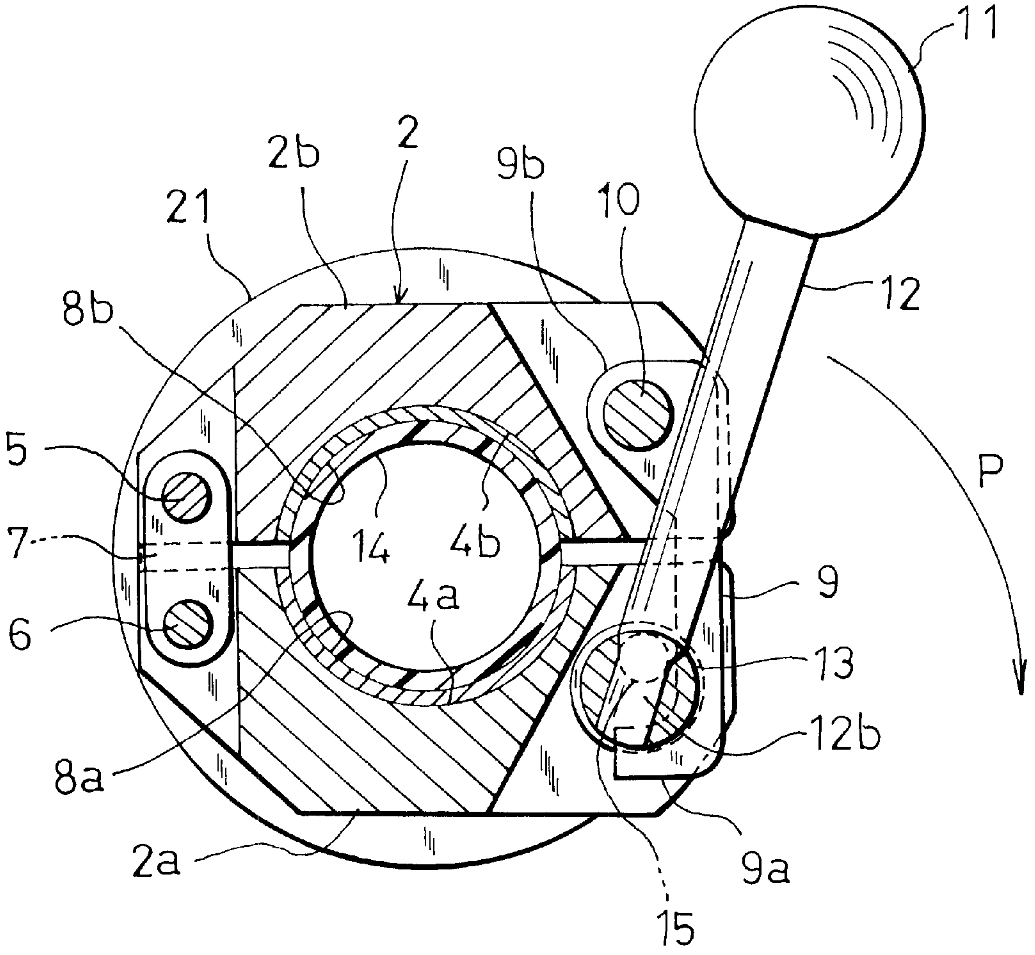
FIG. 3 is a section view taken along the line A—A in FIG. 1.

The pipe member holding portion 2 is configured into a half-split structure consisting of a stationary clamp 2*a* and a movable clamp 2*b*. As shown in FIGS. 2 and 3, the stationary clamp 2*a* is formed integrally with one end in the longitudinal direction of the jig body 1, and has a semicircular clamp groove 4*a*. The movable clamp 2*b* has a semicircular clamp groove 4*b*. One side portion of the movable clamp 2*b* is pivotally coupled to one side portion of the stationary clamp 2*a* by a hinge member 7 the upper and lower ends of which are pivotally attached to the stationary clamp 2*a* and the movable clamp 2*b* by pins 5 and 6, respectively. The posture of the movable clamp 2*b* with respect to the stationary clamp 2*a* is changeable about the hinge member 7 between a closing posture which is indicated by the solid lines in FIG. 2, and an opening posture which is indicated by the two-dot chain lines in the figure. Friction members 8*a* and 8*b* formed by rubber sheets or the like are bonded to the clamp grooves 4*a* and 4*b*, respectively.

A basal end portion 9*b* of a locking member 9 which has a hook portion 9*a* at the tip end is pivotally attached to the other side portion of the movable clamp 2*b* so as to be vertically swingable about a support shaft 10. By contrast, a short operating lever 12 which has a knob 11 at the tip end is attached to the other side portion of the stationary clamp 2*a* so as to be vertically swingable about an eccentric cam shaft 13 that horizontally elongates on the stationary clamp 2*a*, by integrally inserting and coupling a basal end portion 12*b* of the lever into a middle portion of the eccentric cam shaft 13.

Figure 4:
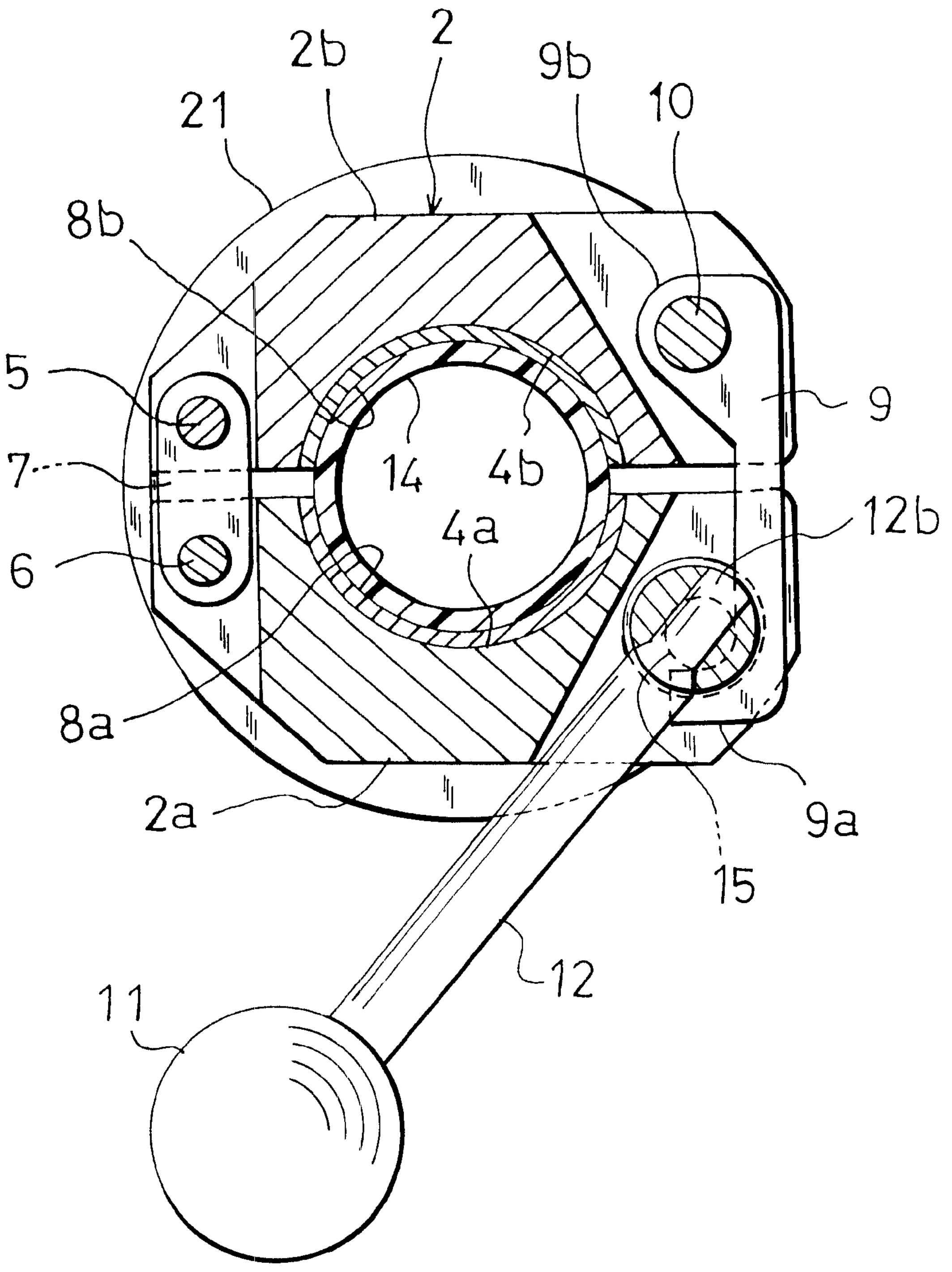
FIG. 4 is a section view showing a state where a pipe member made of resin is completely fastened to a pipe member holding portion of the inner ring press-insertion jig of FIG. 1.

As shown in FIG. 3, one end portion of the pipe member 14 made of resin is then placed on the clamp groove 4*a* of the stationary clamp 2*a* in a horizontal posture elongating in the longitudinal direction, and the movable clamp 2*b* is closed to cause the locking member 9 to hang so that the hook portion 9*a* at its tip end is located below an eccentric cam portion 15 which is formed on the eccentric cam shaft 13 so as to be juxtaposed with the basal end portion 12*b* of the operating lever 12. When the operating lever 12 is then swung about the eccentric cam shaft 13 in the downward direction P, the eccentric cam shaft 13 is swung in the same direction, and the eccentric cam portion 15 which is integral with the eccentric cam shaft 13 is similarly swung. In accordance with the downward swing of the eccentric cam portion 15, as shown in FIG. 4, the eccentric cam portion 15 is engaged with the hook portion 9*a* of the locking member 9 to gradually tighten the locking member 9 in a downward direction. This enables the movable clamp 2*b* to be locked to the closing posture, i.e., the state where the pipe member 14 made of resin is fasteningly fixed.

When the operating lever 12 is upward swung from the locked state shown in FIG. 4, the eccentric cam portion 15 is swung in the same direction to cancel the engagement with the hook portion 9*a* of the locking member 9, thereby allowing the locking member 9 to be upward swung. When the locking member 9 is swung upwardly, the movable clamp 2*b* can be opened upwardly from the stationary clamp 2*a*.

As shown in FIG. 1, the press insertion rod supporting portion 3 is formed by resin such as polypropylene, and has an internal thread portion 3*a* configured by square threads or the like. The press insertion rod supporting portion 3 is fitted into the inside of a ring portion 16 which is formed integrally with the rear end in the longitudinal direction of the jig body 1, and fixed thereto by a spring pin 17. A press insertion rod 19 having an external thread portion 19*a* which is to be screwed with the internal thread portion 3*a* is screwingly passed through the press insertion rod supporting portion 3 in a horizontal posture elongating in the horizontal direction. A ring holder 20 is disposed at the front end of the press insertion rod 19. A bottomed cylindrical or disk-like (in the illustrated example, bottomed cylindrical) grip 21 is coupled integrally by a bolt 22 with the rear end of the press insertion rod 19 which is rearward protruded from the press insertion rod supporting portion 3.

Figure 5:
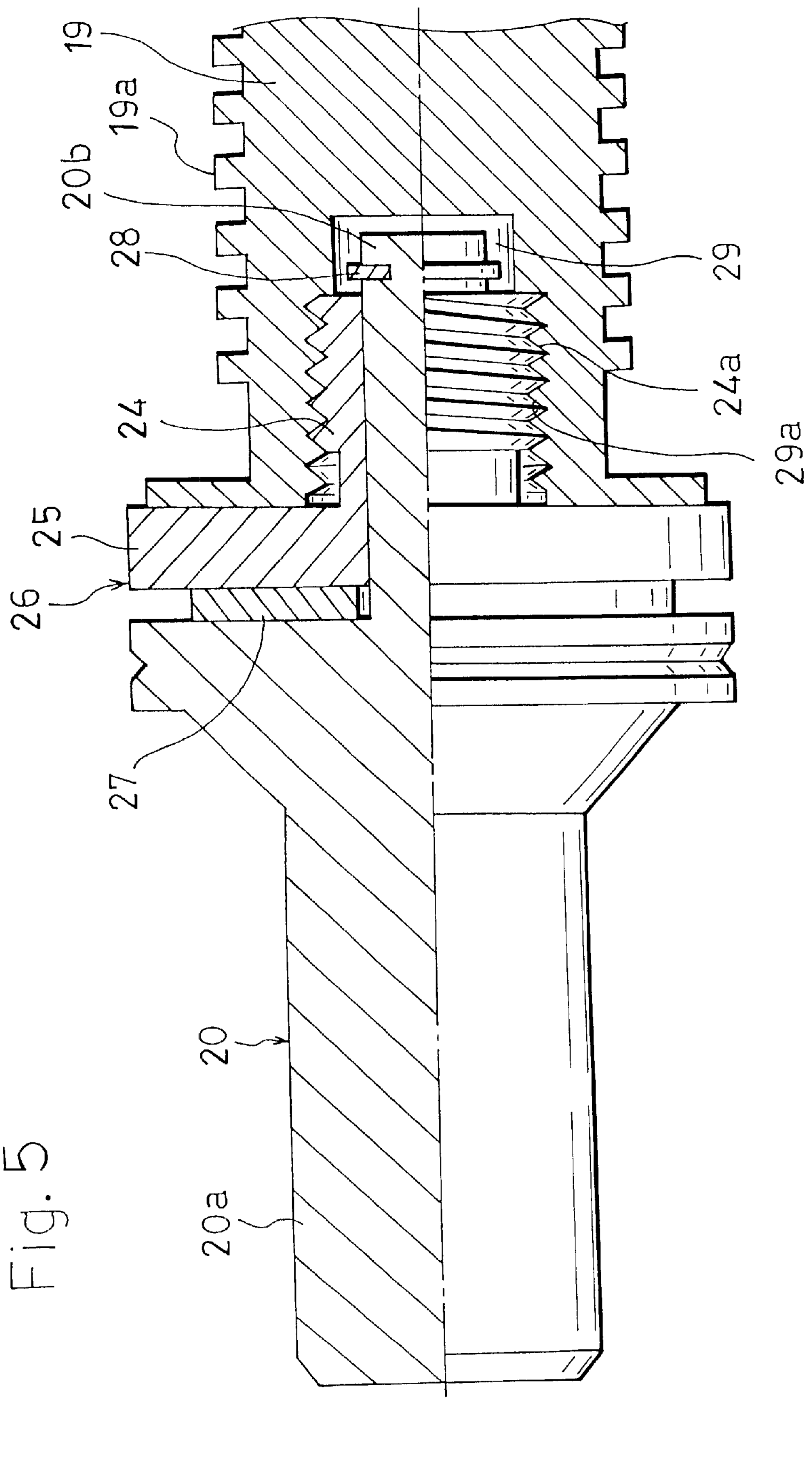
FIG. 5 is a longitudinal side view showing a front end portion of a press insertion rod and a ring holder of the inner ring press-insertion jig of FIG. 1 in a half cutaway state.
Figure 6:
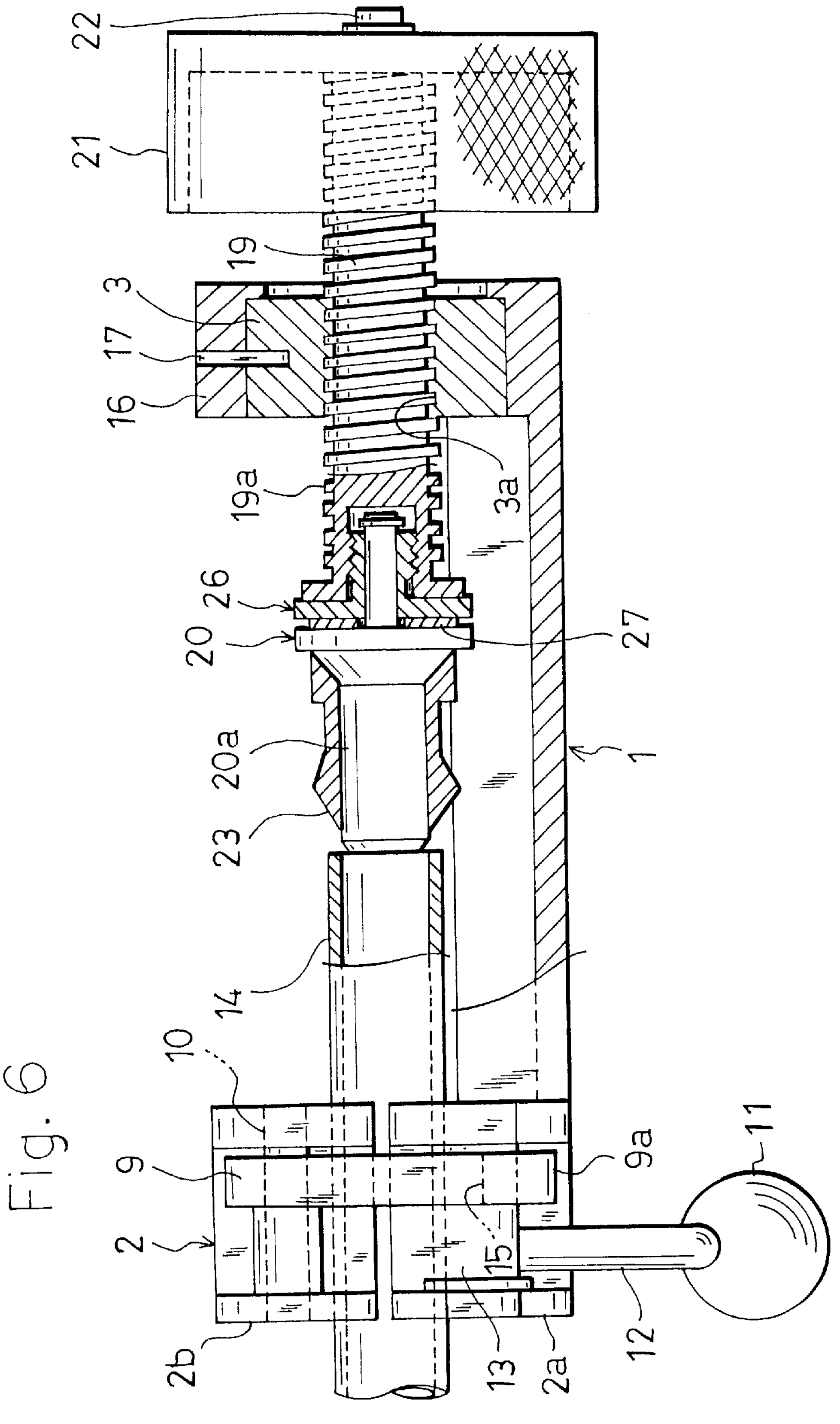
FIG. 6 is a longitudinal partial sectional side view showing the inner ring press-insertion jig of FIG. 1 in a state where press insertion of the inner ring is started.

As shown in FIGS. 5 and 6, the ring holder 20 is formed by a low-friction material such as fluororesin, and has: a flanged ring holding shaft portion 20*a* onto which an inner ring 23 can be inserted and held; and a coupling shaft portion 20*b* which is rearward protruded from a center portion of the rear end face of the ring holding shaft portion 20*a*. The ring holder 20 is idly rotatably coupled to a front end portion of the press insertion rod 19. For this purpose, a holder block 26 is prepared. The holder block 26 is shaped by a low-friction material such as fluororesin, and has: a cylindrical portion 24 in which an external thread portion 24*a* is formed on the outer periphery; and a flange 25 which is formed integrally with the front end of the cylindrical portion 24. The holder block 26 is idly rotatably passed onto the coupling shaft portion 20*b* of the ring holder 20 via a washer 27 made of low-friction resin such as fluororesin. A snap ring 28 is fitted onto a rear end portion of the coupling shaft portion 20*b* which is protruded from the rear end of the cylindrical portion 24 of the holder block 26, whereby the ring holder 20 is attached so as not to slip off from the holder block 26 toward the front side.

Then, the external thread portion 24*a* of the cylindrical portion 24 of the holder block 26 is screwingly fastened to an internal thread 29*a* of an internal thread hole portion 29 disposed in a center portion of the front end face of the press insertion rod 19. As a result, the holder block 26 is screwingly coupled integrally to the front end of the press insertion rod 19, and the ring holder 20 is idly rotatably coupled to the press insertion rod 19. When the flange 25 of the holder block 26 is gripped and rotated in the direction opposite to the fastening direction, the holder block 26 can be detached together with the ring holder 20 from the press insertion rod 19.

According to the thus configured inner ring pressinsertion jig, the inner ring 23 can be pressingly inserted into the one end portion of the pipe member 14 made of resin in the following manner.

Figure 7:
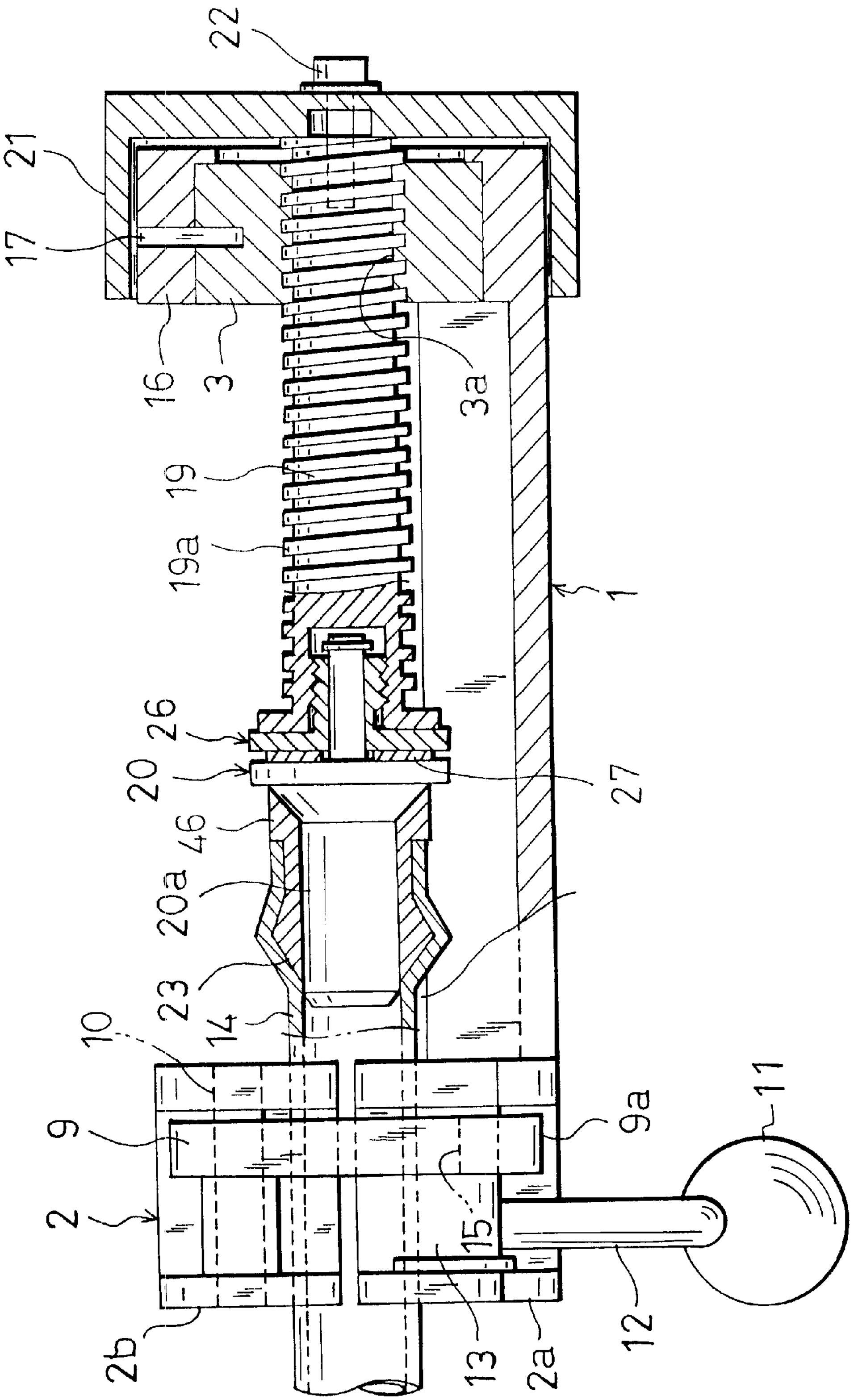
FIG. 7 is a longitudinal partial sectional side view showing the inner ring press-insertion jig of FIG. 1 in a state where press insertion of the inner ring is ended.

As shown in FIG. 6, the inner ring 23 is fittingly held to the ring holding shaft portion 20*a* of the ring holder 20, and the one end portion of the pipe member 14 is held and fixed to the pipe member holding portion 2. Thereafter, the grip 21 is gripped, and the press insertion rod 19 is rotated so as to be advanced. In accordance with the advancement of the press insertion rod 19, the inner ring 23 is gradually pressingly inserted into the one end portion of the pipe member 14. At this time, the ring holder 20 is idly rotatable in the holder block 26 of the front end portion of the press insertion rod 19, and hence the inner ring 23 on the ring holder 20 is straightly advanced without being rotated by the press insertion rod 19. Consequently, torsion is not applied to the pipe member 14 by the inner ring 23. As shown in FIG. 7, at the timing when the inner ring 23 is pressingly inserted to a predetermined depth where the front end of a fitting portion 46 of the inner ring 23 abuts against the one end portion of the pipe member 14 made of resin, the rotation of the press insertion rod 19 is stopped, and the press insertion is ended.

After the press insertion is ended the press insertion rod 19 is reversely rotated by the grip 21 to be retracted to the original position. Then, the ring holder 20 can be extracted from the inner ring 23 which is pressingly inserted into and integrated with the one end portion of the pipe member 14.

In the correct extracting procedure, as described above, the ring holder 20 is extracted from the inner ring 23 in the pipe member 14 by retracting the press insertion rod 19. Some workers may erroneously conduct the procedure in the following manner. The pipe member 14 is detached from the pipe member holding portion 2 while the press insertion rod 19 is not retracted and is kept to be in the advancing state. Then, the pipe member 14 is pulled while a rotation force is forcedly applied to the member, so as to be extracted from the ring holder 20. In such a case also, the ring holder 20 idly rotates in the holder block 26 in the front end portion of the press insertion rod 19 to corotate with the pipe member 14. Therefore, it is possible to prevent torsional deformation from being applied to the pipe member 14.

It is preferable to conduct press insertion of the inner ring 23 under a state where the axial center of the pipe member 14 made of resin coincides with that of the inner ring 23 as far as possible. Therefore, the inner peripheral face of the inner ring 23, and the outer peripheral face of the ring holder 20 are set so as to have a dimension at which a gap as small as possible is formed between the faces, i.e., to be substantially equal in diameter to each other. In this case, since the inner peripheral face of the inner ring 23 is in close contact with the outer peripheral face of the ring holder 20 as a result of the press insertion of the inner ring 23, the ring holder 20 must be extracted from the inner ring 23 with strong force. Even in such a case, the ring holder 20 is not extracted from the holder block 26 because the ring holder 20 is lockedly attached to the holder block 26 via the snap ring 28. Therefore, the workability in the process of extracting the ring holder 20 from the inner ring 23 is excellent.

In the case where the counter pipe member 14 has a different bore diameter, the inner ring 23 of a diameter corresponding to the bore diameter is used. In this case, as described above, the flange 25 of the holder block 26 is gripped and rotated in the direction opposite to the fastening direction, whereby the holder block 26 is detached together with the ring holder 20 from the press insertion rod 19. Thereafter, the ring and the holder are replaced with the inner ring 23 of the desired diameter and the ring holder 20 suitable for holding the ring, respectively. According to this configuration, consequently, it is not required to replace the whole jig, but to replace only the inner ring 23 and the ring holder 20, so that most of the other components of the jig such as the jig body 1 comprising the pipe member holding portion 2 and the press insertion rod supporting portion 3, the press insertion rod 19, and the holder block 26 can be commonly used for different bore diameters.

In joints which are to be used in a chemical liquid supply line in a semiconductor or liquid crystal production process, it is necessary to prevent contaminative fine powder from entering the line. To comply with this, the ring holder 20 is enabled to be idly rotated via the washer 27 made of low-friction resin. According to this configuration, even when works of pressingly inserting an inner ring are repeatedly conducted, generation of abrasion powder between the ring holder 20 and the holder block 26 can be suppressed as far as possible. Since both or one of the ring holder 20 and the holder block 26 are formed by a low-friction material such as fluororesin, also generation of abrasion powder between the inner peripheral face of the holder block 26 and the outer peripheral face of the coupling shaft portion 20*b* of the ring holder 20 can be suppressed.

Figure 8:
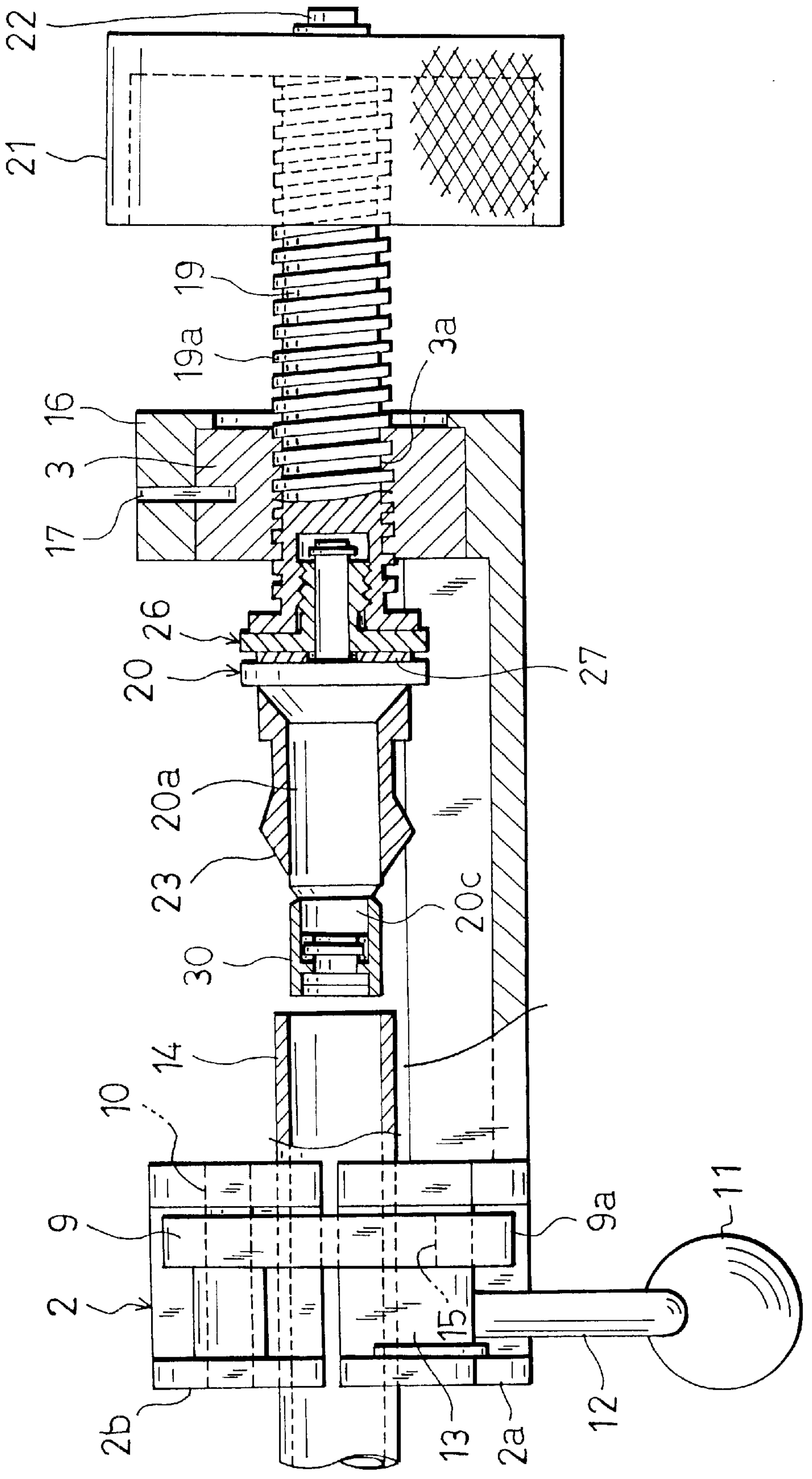
FIG. 8 is a longitudinal side view showing an inner ring press-insertion jig of another embodiment in a half cutaway state.

FIGS. 8 to 11 show another embodiment. FIG. 8 is a longitudinal side view showing an inner ring press-insertion jig in a half cutaway state. In the inner ring press-insertion jig, a diameter-expanding ring member 30 is additionally used in order to facilitate press insertion of the inner ring 23 into the pipe member 14 in the case where there is a dimensional error in which, for example, the inner diameter of the inner ring 23 is larger than that of the pipe member 14 made of resin.

Figure 9:
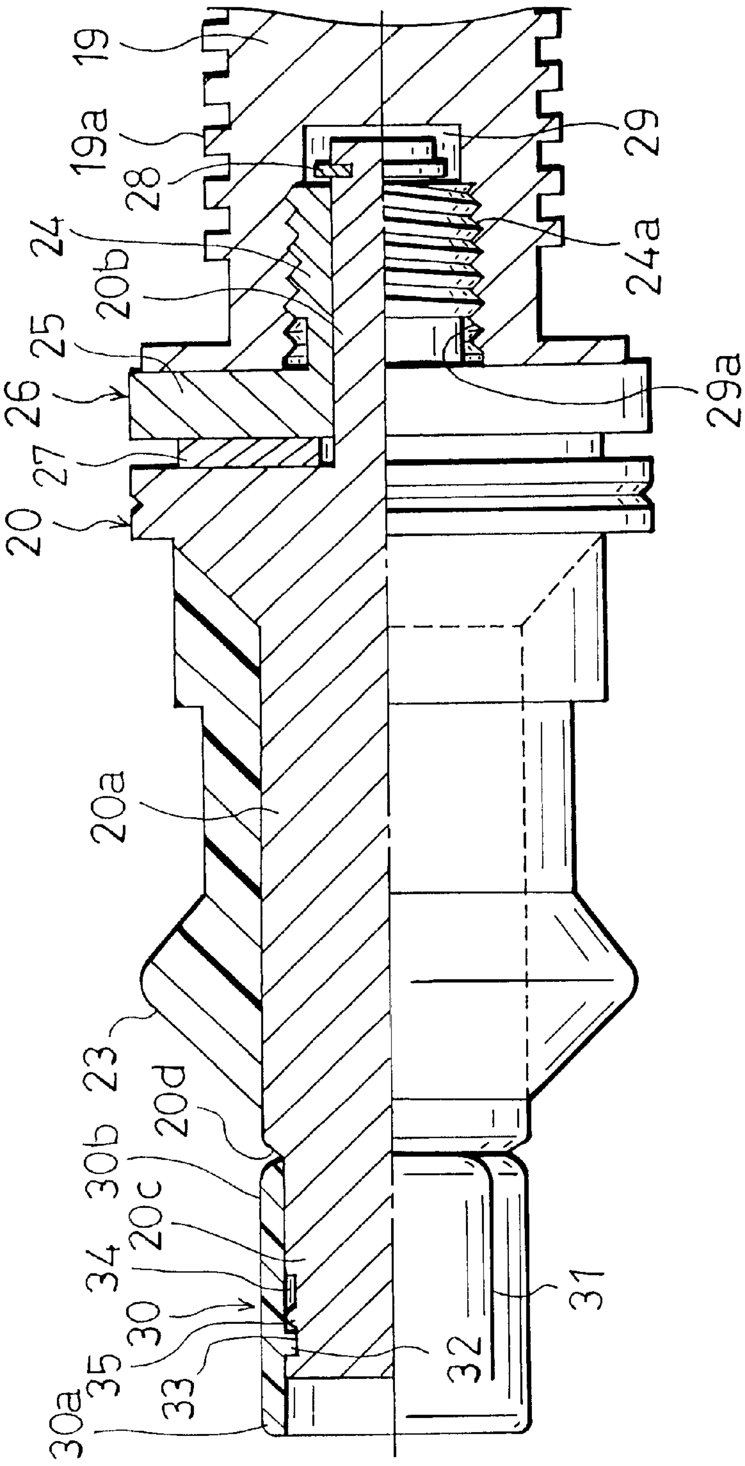
FIG. 9 is a longitudinal side view showing a front end portion of a press insertion rod and a ring holder of the inner ring press-insertion jig of FIG. 8 in a half cutaway state.
Figure 10:
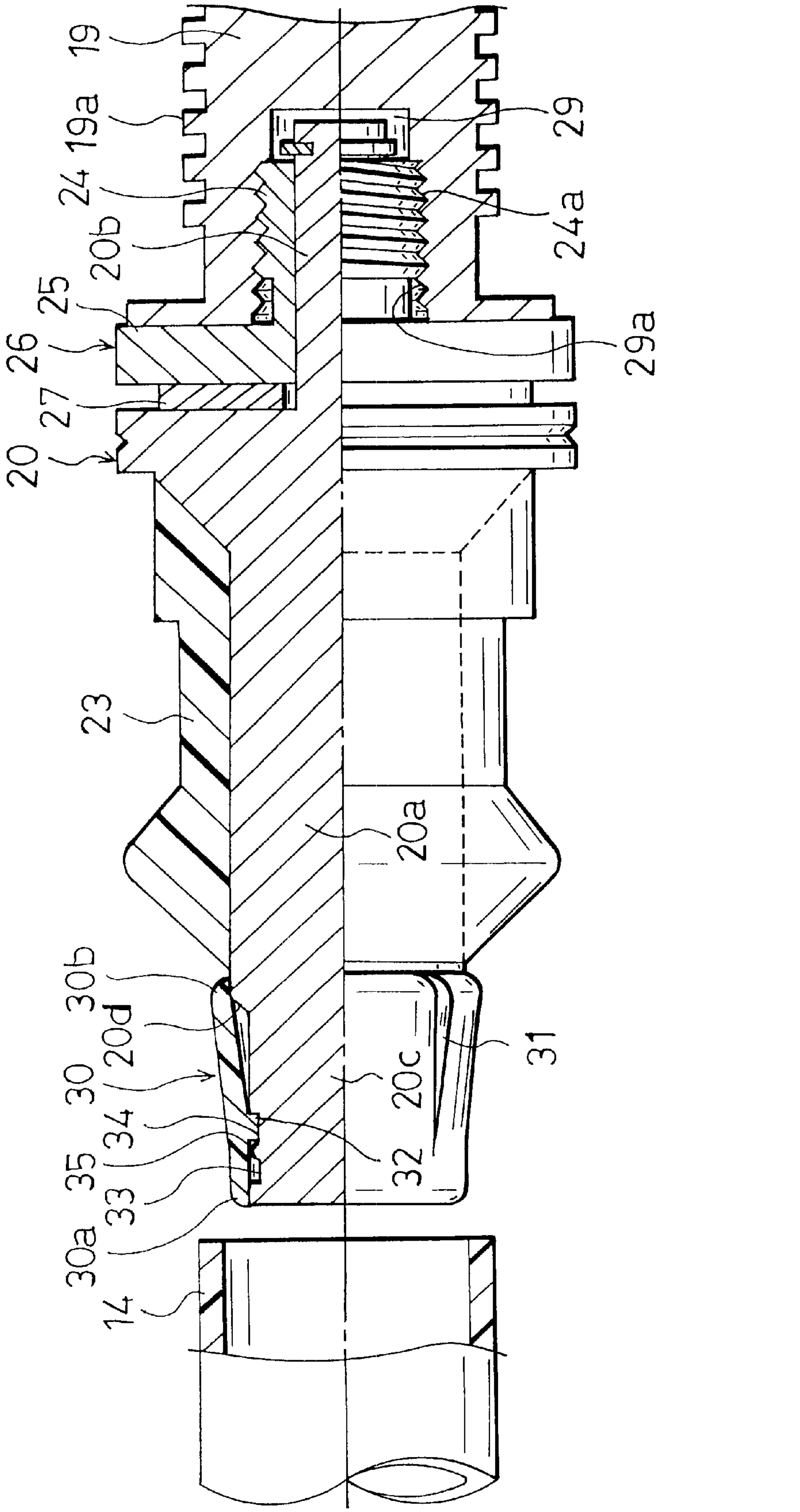
FIG. 10 is a longitudinal half sectional side view showing a front end portion of a press insertion rod of the inner ring press-insertion jig of FIG. 8 in a state where press insertion of an inner ring is started.

As shown in FIGS. 9 and 10, the diameter-expanding ring member 30 is formed so that the outer diameter of a front end portion 30*a* is smaller than the inner diameter of the inner ring 23, and formed so as to be elastically expandingly and contractingly deformable between a reduced-diameter state (see FIG. 9) in which the outer diameter of the rear end portion 30*b* is reduced so as to be equal to that of the front end portion 30*a*, and an increased-diameter state (see FIG. 10) in which the outer diameter of the rear end portion 30*b* is increased so as to be larger than that of the front end portion 30*a*. The diameter-expanding ring member 30 is formed by resin such as polypropylene, and plural slits 31 elongating from an intermediate position in the longitudinal direction of a peripheral wall of the diameter-expanding ring member 30 are formed so as to reach the rear end, as means for enabling the elastic expanding and contracting deformation. A small-diameter shaft portion 20*c* which is smaller in diameter than the ring holding shaft portion 20*a* of the ring holder 20 is continuously formed in the front end of the ring holding shaft portion 20*a* via a tapered step portion 20*d*.

The diameter-expanding ring member 30 is passed onto the small-diameter shaft portion 20*c* so as to be axially movable between two positions, or an advanced position and a retracted position. The diameter-expanding ring member 30 is configured so as to be elastically deformed into the reduced-diameter state when the rear end portion 30*b* is in the advanced position as shown in FIG. 9, and into the increased-diameter state when the rear end portion 30*b* is in the retracted position as shown in FIG. 10. Specifically, a protrusion 32 is disposed on the inner peripheral face of the diameter-expanding ring member 30, and a first groove 33 for stopping in the advanced position, and a second groove 34 for stopping in the retracted position are formed in the outer peripheral face of the small-diameter shaft portion 20*c* so as to be separated in the longitudinal direction and elongate in the circumferential direction. A low mountain-like projection 35 is formed between the first circumferential groove 33 and the second circumferential groove 34. The diameter-expanding ring member 30 is configured so that, in the advanced position where the protrusion 32 is engaged with the first groove 33 as shown in FIG. 9, the rear end portion 30*b* is deformed into the reduced-diameter state in which the slits 31 are closed, and, when the protrusion 32 overrides the projection 35 to reach the retracted position where the protrusion 32 is engaged with the second groove 34 as shown in FIG. 10, the rear end portion 30*b* of the diameter-expanding ring member 30 slides over the step portion 20*d* to reach on the ring holding shaft portion 20*a*, whereby the slits 31 are opened and the diameter-expanding ring member 30 is deformed into a funnel-like shape in which the diameter increases as moving from the intermediate position in the longitudinal direction toward the rear end portion 30*b*.

The inner ring press-insertion jig is configured in the same manner as the inner ring press-insertion jig of the above-mentioned embodiment, except the additional use of the diameter-expanding ring member 30 and the shape of the ring holder 20 which enables the additional use. Therefore, the identical members and components are denoted by the same reference numerals, and their description is omitted.

Next, the manner of pressingly inserting the inner ring 23 into the one end portion of the pipe member 14 by using the thus configured inner ring press-insertion jig will be described.

As shown in FIG. 9, the diameter-expanding ring member 30 on the small-diameter shaft portion 20*c* of the ring holder 20 is stopped and held in the advanced position to set the rear end portion 30*b* to the reduced-diameter state. Under this state, the inner ring 23 is fittingly held to the ring holding shaft portion 20*a*. Then, the diameter-expanding ring member 30 is moved to the retracted position as shown in FIG. 10, whereby the diameter-expanding ring member 30 is stopped and held while the slits 31 are opened to set the rear end portion 30*b* to the increased-diameter state.

Then, the one end portion of the pipe member 14 is held and fixed to the pipe member holding portion 2, and thereafter the grip 21 is gripped and the press insertion rod 19 is rotated so as to be advanced. This advancement of the press insertion rod 19 causes the diameter-expanding ring member 30 to enter the one end portion of the pipe member 14 to increase the diameter of the one end portion of the pipe member 14, so that the inner ring 23 is pressingly inserted into the diameter-increasing one end portion of the pipe member 14. Even in the case where there is a dimensional error in which, for example, the inner diameter of the inner ring 23 is larger than that of the pipe member 14, the inner ring 23 can be smoothly pressingly inserted into the pipe member 14 by means of the function of increasing the diameter of the pipe member 14 by the diameter-expanding ring member 30, and the function of guiding the pipe member 14 into the inner ring 23. Furthermore, the work of pressingly inserting the inner ring 23 at ordinary temperature is enabled without employing a preheating method in which one end portion of the pipe member 14 is preheated and softened before the press insertion and the inner ring 23 is then pressingly inserted. When such a preheating method is employed, there arises a disadvantage that a pipe member cannot be connected to a pipe joint until the heating temperature is sufficiently lowered after the press insertion, and hence the total working time period is prolonged. According to the embodiment, this disadvantage can be eliminated, and the pipe member can be connected to a pipe joint immediately after the press insertion, whereby the total working time period can be shortened.

Figure 11:
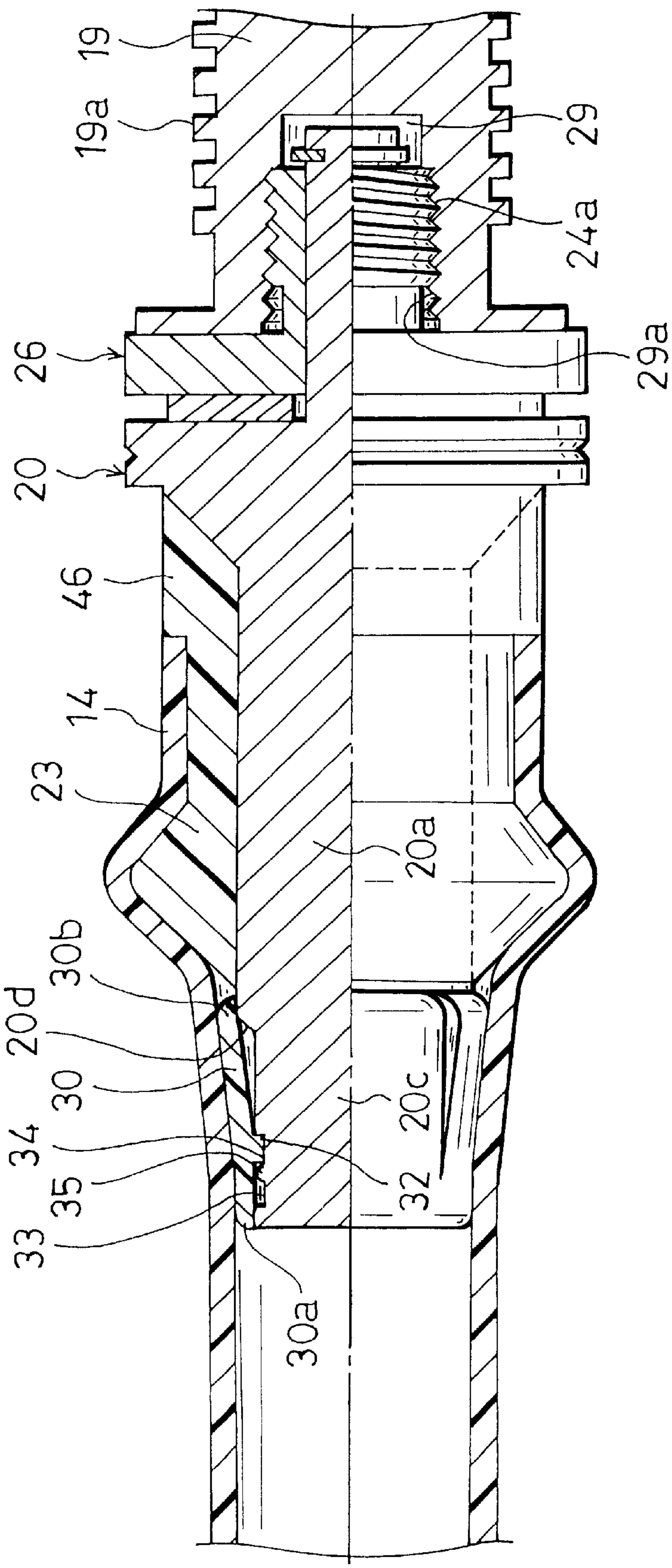
FIG. 11 is a longitudinal half sectional side view showing the front end portion of the press insertion rod of the inner ring press-insertion jig of FIG. 8 in a state where press insertion of the inner ring is ended.

At the timing when the inner ring 23 is pressingly inserted to a predetermined depth where the front end of the fitting portion 46 of the inner ring 23 abuts against the one end portion of the pipe member 14 as shown in FIG. 11, the rotation of the press insertion rod 19 is stopped, and the press insertion is ended. After the press insertion is ended, the press insertion rod 19 is reversely rotated to be retracted to the original position, whereby the diameter-expanding ring member 30 is pushed back to the original advanced position in the front end portion of the inner ring 23 which is pressingly inserted and fixed into the one end portion of the pipe member 14. Then, the diameter-expanding ring member 30 can be extracted together with the ring holder 20 from the inner ring 23.

Figure 12:
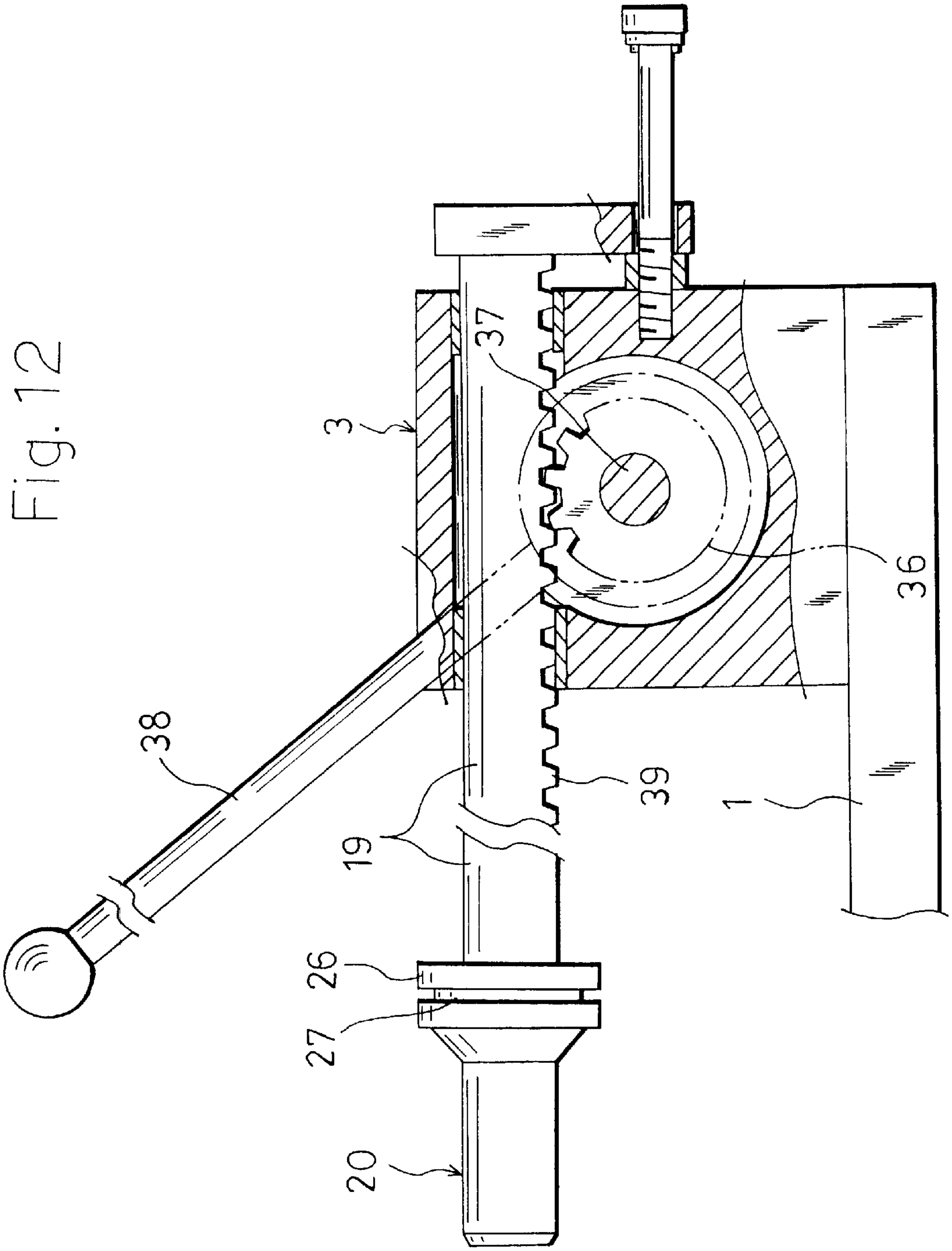
FIG. 12 is a longitudinal section view showing a modification of the side of a press insertion rod supporting portion of the inner ring press-insertion jig.
Figure 13:
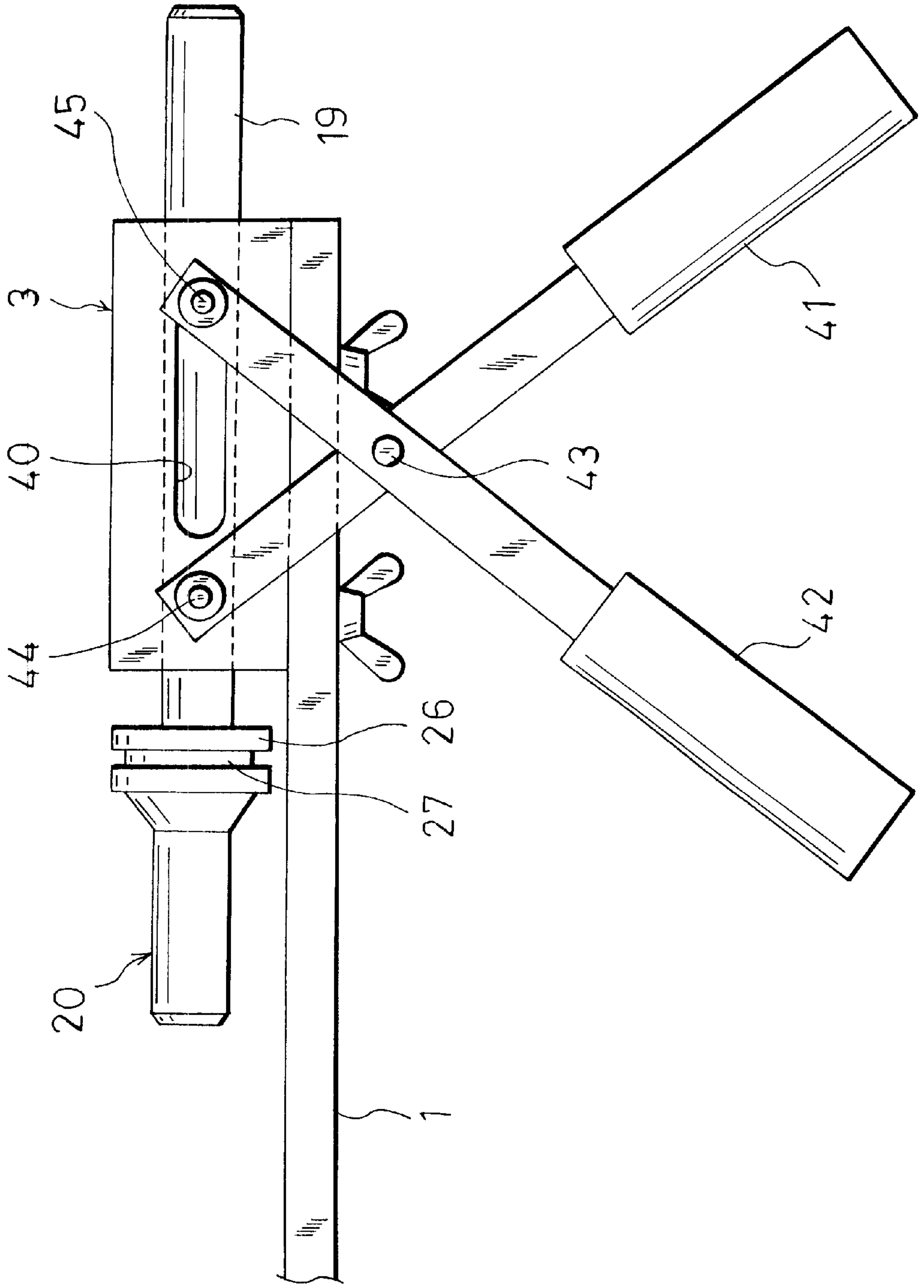
FIG. 13 is a side view showing another modification of the side of the press insertion rod supporting portion of the inner ring press-insertion jig.
Figure 14:
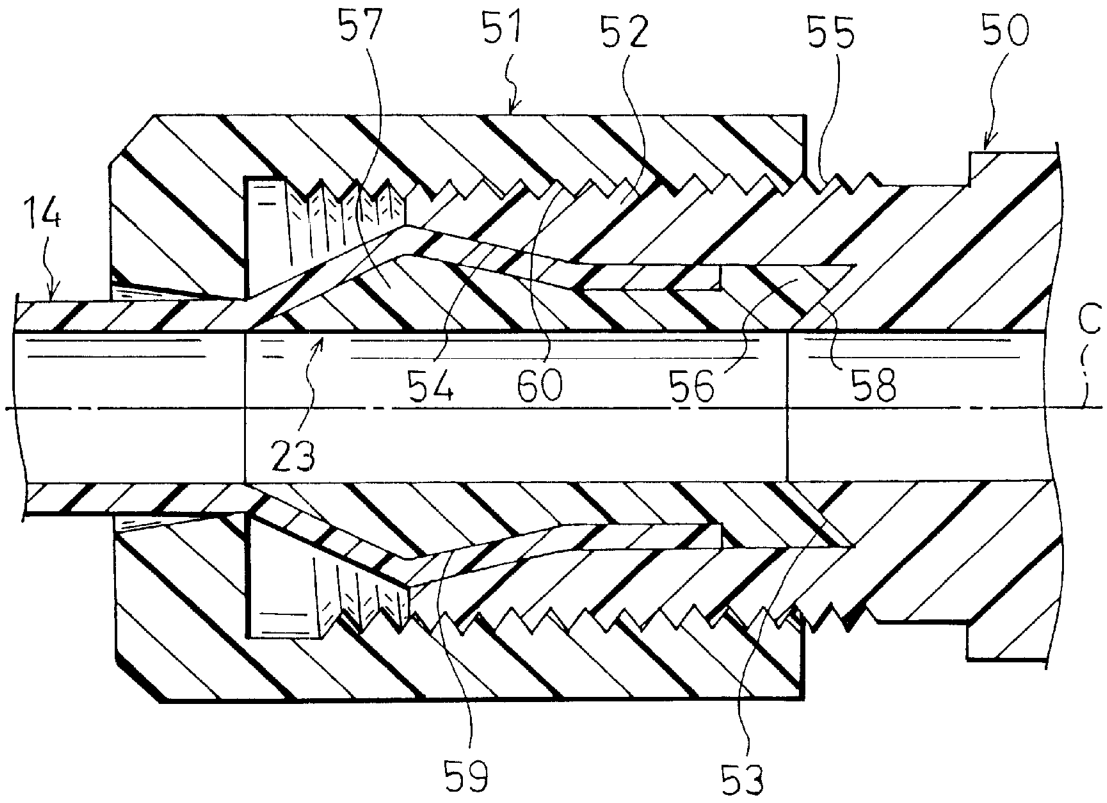
FIG. 14 is a longitudinal section view showing an example of a known pipe joint made of resin.
Figure 15:
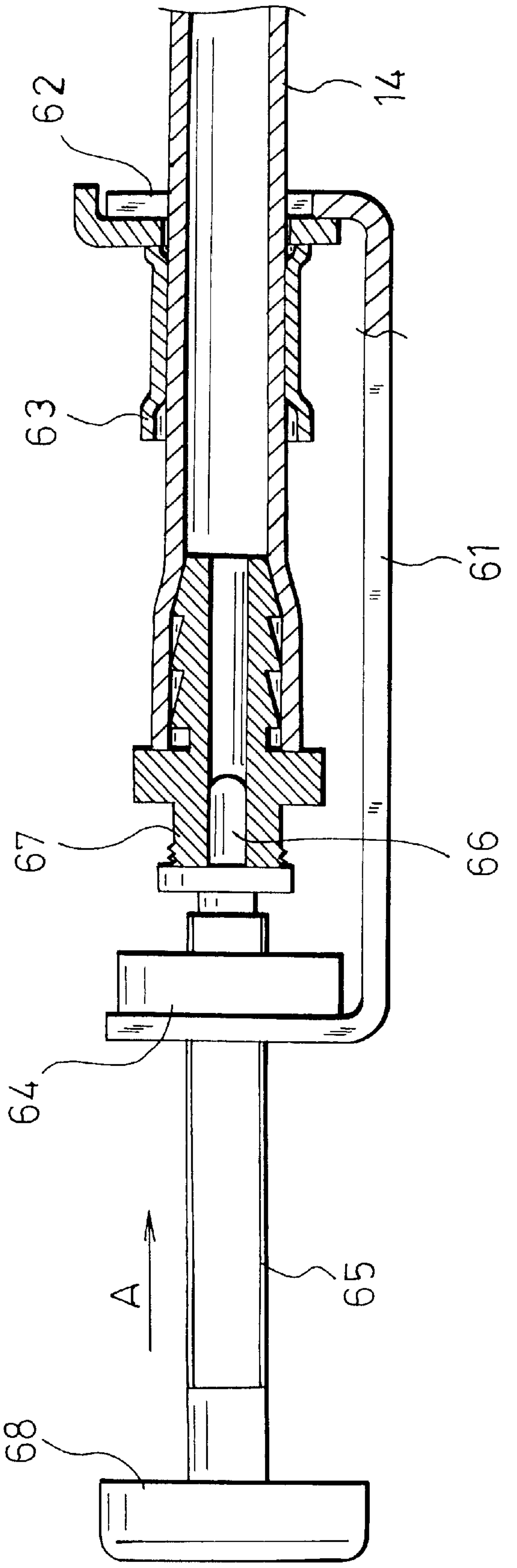
Fig. 15 (PRIOR ART)
FIG. 15 is a side view of an inner ring press-insertion jig of the conventional art.
Figure 16:
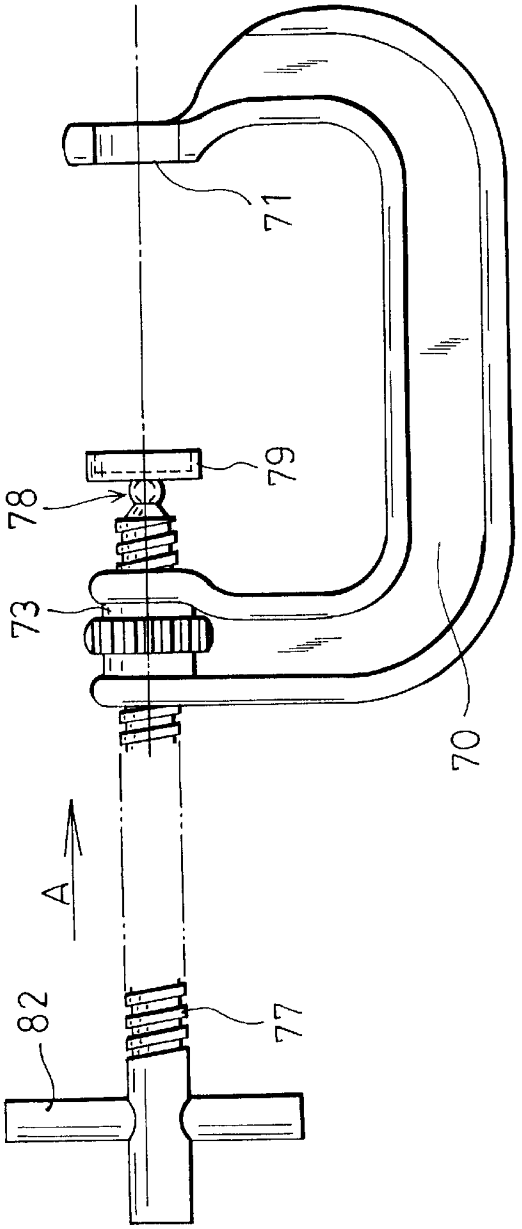
Fig. 16 (PRIOR ART)
FIG. 16 is a side view of another inner ring press-insertion jig of the conventional art.
Figure 17:
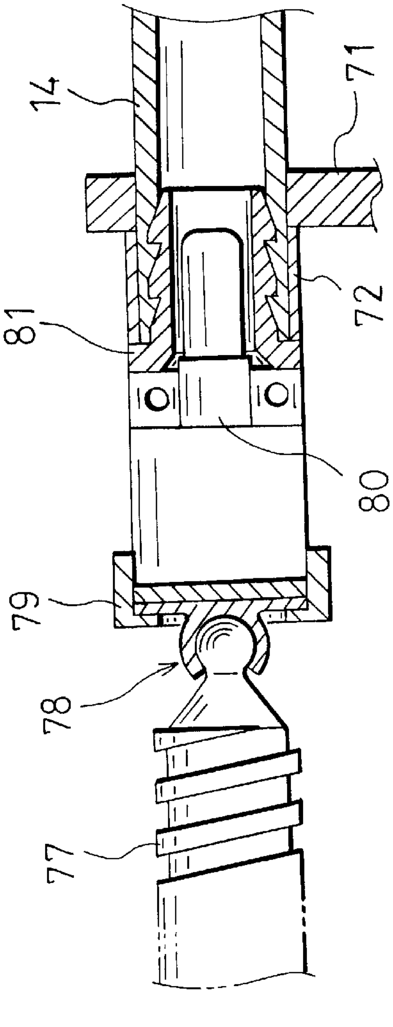
Fig. 17 (PRIOR ART)
FIG. 17 is a section view showing a state where press insertion of an inner ring in the inner ring press-insertion jig of FIG. 16 is ended.

The invention can be similarly applied also to a type in which, as shown in FIG. 12 or 13, the press insertion rod 19 is advanced and retracted by a lever system, instead of the grip system in which, as in the embodiments described above, the external thread portion 19*a* is disposed in the press insertion rod 19 and advancement and retraction of the press insertion rod 19 are operated by gripping the grip 21 disposed in the rear end portion of the press insertion rod 19.

In the lever system shown in FIG. 12, the press insertion rod supporting portion 3 of the jig body 1 is formed into a gear box-like shape. A pinion 36 is incorporated into the press insertion rod supporting portion 3, and a press insertion operating lever 38 which rotates the pinion 36 about an axis 37 is disposed so as to be swingable in the longitudinal direction. By contrast, the press insertion rod 19 having a rack 39 is passed through the press insertion rod supporting portion 3 so that the rack 39 meshes with the pinion 36. In the same manner as the embodiments described above, the ring holder 20 which holds the inner ring 23 is idly rotatably and detachably coupled to a front end portion of the press insertion rod 19.

According to this configuration, when the press insertion operating lever 38 is forward swung, the press insertion rod 19 is advanced via the mesh between the pinion 36 and the rack 39. In the same manner as the embodiments described above, this advancement causes the inner ring 23 held by the front end of the ring holder 20 to be pressingly inserted into the one end portion of the pipe member 14 which is held and fixed to the pipe member holding portion 2 of the jig body 1. When the press insertion operating lever 38 is rearward swung after the press insertion, the press insertion rod 19 is retracted via the pinion 36 and the rack 39. In the same manner as the embodiments described above, this retraction causes the ring holder 20 to be extracted from the inner ring 23 which is pressingly inserted and fixed into the one end portion of the pipe member 14.

In the lever system shown in FIG. 13, the press insertion rod supporting portion 3 of the jig body 1 is formed into a cylindrical shape which elongates in the longitudinal direction, the press insertion rod 19 is passed through the press insertion rod supporting portion 3 so as to be longitudinally movable, and a groove 40 is longitudinally opened in one side face of the press insertion rod supporting portion 3. On the other hand, a pair of press insertion operating levers 41 and 42 are coupled to each other by a pivotal pin 43 so as to cross in an X-shape. A swing basal end portion of the one press insertion operating lever 41 is pivotally attached by a pin 44 onto the one side face of the press insertion rod supporting portion 3. A swing basal end portion of the other press insertion operating lever 42 and the pressing insertion rod 19 are coupled to each other by a coupling pin 45 which can slide in the groove 40. According to this configuration, when the pair of press insertion operating levers 41 and 42 are closed so as to approach each other, the press insertion rod 19 can be advanced, and, when the pair of press insertion operating levers 41 and 42 are opened so as to separate from each other, the press insertion rod 19 can be retracted. In the same manner as the embodiments described above, this advancement of the press insertion rod 19 causes the inner ring 23 held by the ring holder 20 which is coupled idly rotatably and detachably to the front end portion of the press insertion rod 19, to be pressingly inserted into the one end portion of the pipe member 14 which is held and fixed to the pipe member holding portion 2 of the jig body 1, and this retraction of the press insertion rod 19 causes the ring holder 20 to be extracted from the inner ring 23 which is pressingly inserted and fixed into the one end portion of the pipe member 14.

The entire disclosure of Japanese Patent Application No. 2000-315228 filed on Oct. 16, 2000 including specification, claims, drawings and summary are incorporated herein by reference in its entirety.

What is claimed is:

1. An inner ring press-insertion jig for a pipe member made of resin for inserting a sleeve-like inner ring into one end portion of a pipe member made of resin, wherein:

a pipe member holding portion which horizontally fixedly holds one end portion of said pipe member is placed in a front end side in a longitudinal direction of a jig body, and a press insertion rod supporting portion is placed in a rear end side to be opposed to said pipe member holding portion;

a press insertion rod is passed through and supported by said press insertion rod supporting portion in an advanceable and retractable manner;

a ring holder which has at a front end a ring holding shaft portion that extractably holds an inner ring is detachably coupled to a front end of said press insertion rod idly rotatable about an axis;

an internal thread hole portion is disposed in a center portion of a front end face of said press insertion rod, a coupling shaft protrudes rearwardly from a center portion of a rear end face of said ring holder, a holder block is passed idly rotatably and lockedly through said coupling shaft portion of said ring holder, said holder block having: a cylindrical portion in which an external thread portion is formed on an outer peripheral; and a flange which is formed integrally with a front end of said cylindrical portion, and said external thread portion of said cylindrical portion is screwingly coupled to said internal thread hole portion; and an internal thread portion is disposed in said press insertion rod supporting portion, said press insertion rod has an external thread portion which is to be screwed with said internal thread portion, and is passed through said press insertion rod supporting portion, and a grip is disposed in a rear end portion of said press insertion rod which protrudes rearwardly from said press insertion rod supporting portion.

2. An inner ring press-insertion jig for a pipe member made of resin according to claim 1, wherein a washer made of low-friction resin is interposed between said rear end face of said ring holder and said flange of said holder block.

3. An inner ring press-insertion jig for a pipe member made of resin according to claim 1, wherein at least one of said holder and said holder block is formed by a low-friction resin material.

4. An inner ring press-insertion jig for a pipe member made of resin according to claim 2, wherein at least one of said holder and said holder block is formed by a low-friction resin material.

5. An inner ring press-insertion jig for a pipe member made of resin according to claim 1, wherein said pipe member holding portion is configured into an openable half-split structure which consists of a stationary clamp and a movable clamp.

6. An inner ring press-insertion jig for a pipe member made of resin according to claim 1, wherein a small-diameter shaft portion which is smaller in diameter than said ring holding shaft portion is continuously formed in said front end of said ring holding shaft portion via a tapered step portion, and a diameter-expanding ring member in which an outer diameter of a front end portion is smaller than an inner diameter of said inner ring, and a rear end portion is formed to be elastically expandingly and contractingly deformable is passed to be axially movable with respect to said small-diameter shaft portion between two positions, or an advanced position and a retracted position, and, in said retracted position, is elastically deformed into an increased-diameter state.

7. An inner ring press-insertion jig for a pipe member made of resin according to claim 1, wherein a small-diameter shaft portion which is smaller in diameter than said ring holding shaft portion is continuously formed in said front end of said ring holding shaft portion via a tapered step portion, and a diameter-expanding ring member in which an outer diameter of a front end portion is smaller than an inner diameter of said inner ring, and a rear end portion is formed to be elastically expandingly and contractingly deformable is passed to be axially movable with respect to said small-diameter shaft portion between two positions, or an advanced position and a retracted position, and, in said retracted position, is electrically deformed into an increased-diameter state.

* * * * *

UNITED STATES PATENT AND TRADEMARK OFFICE
CERTIFICATE OF CORRECTION

PATENT NO. : 6,550,119 B2
DATED : April 22, 2003
INVENTOR(S) : Takuya Ishida et al.

It is certified that error appears in the above-identified patent and that said Letters Patent is hereby corrected as shown below:

Column 12,
Line 50, "electrically" should be -- elastically --.

Signed and Sealed this

Twenty-fourth Day of June, 2003

JAMES E. ROGAN
*Director of the United States Patent and Trademark Office*